United States Patent [19]

Flogaus et al.

[11] 3,812,357

[45] May 21, 1974

[54] MINIATURE INFRARED SHORT RANGE THERMAL IMAGER (MISTI)

[75] Inventors: William S. Flogaus; Howard T. Graves, both of Alexandria; Harold J. Orlando, Woodbridge; Dennis P. Van Der Laske, Alexandria, all of Va.

[73] Assignee: The United States of America as represented by the Secretary of the Army, Washington, D.C.

[22] Filed: Dec. 21, 1972

[21] Appl. No.: 317,319

[52] U.S. Cl. .................. 250/332, 250/330, 250/334, 250/338

[51] Int. Cl. .............................................. G01j 5/02

[58] Field of Search ........... 250/330, 332, 333, 334, 250/338, 341

[56] References Cited

UNITED STATES PATENTS

| | | | |
|---|---|---|---|
| 3,610,930 | 10/1971 | Lacy et al. | 250/332 |
| 3,379,885 | 4/1968 | Nork | 250/338 |
| 3,581,089 | 5/1971 | Craig | 250/330 X |

*Primary Examiner*—Archie R. Borchelt

*Attorney, Agent, or Firm*—Edward J. Kelly; Herbert Berl

[57] ABSTRACT

A compact lightweight infrared to visible image converter is disclosed having a single circular oscillation circuit board assembly which carries all of the electronics except the power supply. An array of light emitting diodes is coupled to an array of infrared detectors both of which are mounted on the above to scan in unison.

10 Claims, 4 Drawing Figures

MINIATURE INFRARED SHORT RANGE THERMAL IMAGER (MISTI)

The invention described herein may be manufactured, used, and licensed by or for the Government for governmental purposes without the payment to me of any royalty thereon.

BACKGROUND OF THE INVENTION

Most systems of infrared viewing and particularly real-time devices employ infrared detecting diodes. Typical of such systems are the AN/PAS series currently used by the military and the Universal Viewer disclosed in U.S. Pat. application No. 231,545 to Patrick J. Daly, et al. filed Mar. 3, 1972. All of the above systems use a row of diodes over which the infrared image is scanned by means of an oscillating mirror. This element is specially manufactured to provide optimum reflection without distortion and to withstand the torsional forces involved. In addition these earlier systems require thermoelectric or gas cooled detectors, heavy Germanium lenses, cathode ray tubes, and other equipment which made it difficult to transport and maintain them.

SUMMARY OF THE INVENTION

The present invention provides a simple light weight viewer which is a complete self contained unit having its own integrated power supply and can easily be held in one hand. The power is derived from a plurality of A cell batteries connected in series and parallel to provide the required operating voltages. Instead of a mirror scan the detecting diodes are moved across a fixed infrared image. A like number of light emitting diodes (LEDs) are connected to the detectors via the rotatable circuit board to move in a like manner and trace out a visible image of the infrared image. A lightweight catadioptic reflector lens is used to focus the IR image and a plastic eyepiece lens is used to view the visible image. Since the reflector lens also works with visible light, it is a simple matter to make bench adjustments of the system. The conversion from an infrared to a visible light image is accomplished by non-cooled pyroelectric detectors coupled to LEDs by electronic amplifiers. The object is to obtain a small lightweight but reliable system with sufficient resolution for short range surveillance by a single operator.

BRIEF DESCRIPTION OF THE DRAWINGS

How the above objectives are achieved is best understood with reference to the attached drawings wherein.

DESCRIPTION OF THE INVENTION

Figure 1:
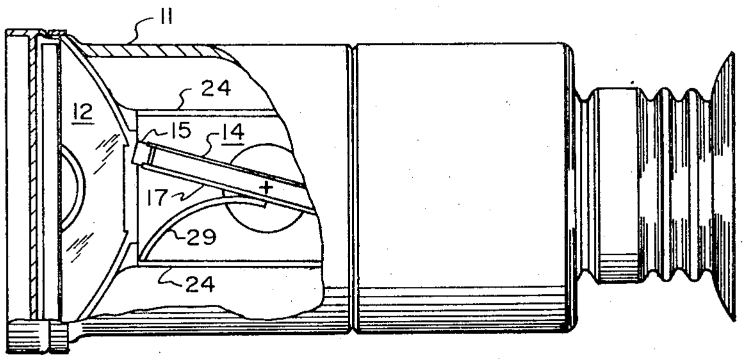
FIG. 1 shows a top view of the complete viewer with the front section broken away to show inner detail.
Figure 2:
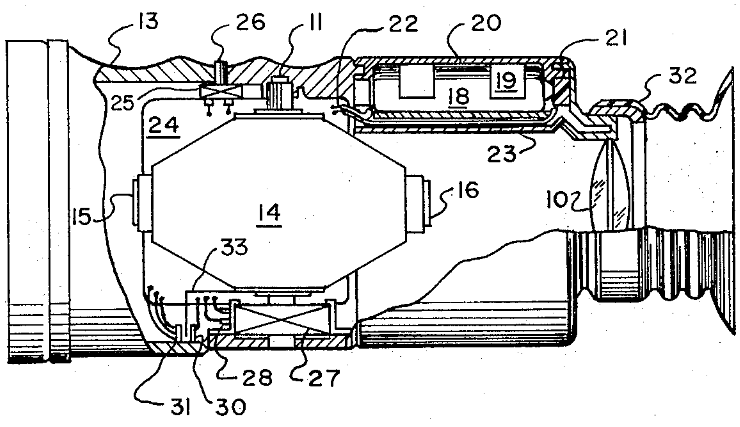
FIG. 2 shows a side view of the viewer with a rear section broken away to show additional detail.

As shown in FIGS. 1 and 2 the structure of the imager is arranged so that an outer cylindrical member 11 acts as an optical platform for an infrared IR catadioptic projection lens system 12 and an eyepiece 10 for visible images. The platform is preferably formed in cylindrical sections which threadably engage one another, some of which may be split longitudinally and/or provided with parts and hatch covers to permit easy access for assembly and maintenance of internal components. The outer surface may contain corrugations 13 to prevent droppage and facilitate orientation of the imager at night. The lenses are readily available commercially in any desired size and focal length. Available lens materials include glass, metal and plastics, the latter being well suited for thin fresnel type lenses and reflector substrates.

Figure 3:
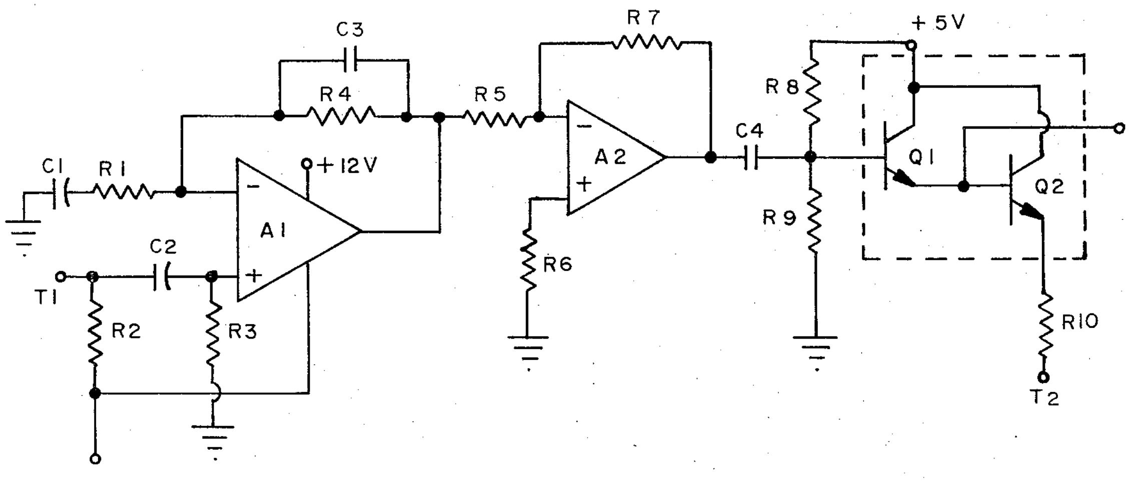
FIG. 3 shows a schematic diagram of one of the signal processing circuits mounted on scanning board 14 (FIGS. 1 and 2) which converts infrared light to visible light for one line element of an image.

Between the focal planes of the IR and visible lenses is located a scanning board 14 which performs the conversion from one type of image to the other. Along the scanning edge of the board that lies in the IR focal plane is mounted a narrow array 15 of IR detecting diodes. Similarly along the viewing edge that lies in the visible focal plane an array 16 of light emitting diodes (LEDs) is attached. The length of each array determines one dimension of its associated image. The board is pivoted about an axis substantially parallel to the focal planes and sufficient clearance is provided by the platform and other elements thereon so that the edge can sweep out the remaining dimensions of the images. Since the focal plane is slightly curved it may be desirable to curve the arrays as a means of compensation. The electronic amplifiers needed to intercouple each detector to its corresponding LEDs are sandwiched between two insulating sheets 17 that form the outer surfaces of the scanning board. These will be discussed in more detail when FIG. 3 is described. Imagining a separate straight line drawn between the centers of each pair of interconnected diodes, there will be no distortion if all such lines pass through a common point and the inverted IR image will produce an erect visible one. For a noninverting converter, except when the lines are parallel, obvious angular relationships are required. Uniform spacing of both types of diodes gives uniform contrast and brightness.

Power for the imager is supplied by a plurality of small batteries 18, e.g. "A" cells, located in an outer annular cavity near the viewing end of the platform. Each battery is held in place by a pocket 19 which may be part of the platform (or a removeable belt 21) to facilitate removal and replacement. An insulated contact 21 is provided on the platform at each end of every battery and the leads 22 from each contact pass through an annular conduit 23 and terminate on a power control board 24. A normally open multi-pole single throw pressure switch 25 mounted on the control board has a finger actuator 26 protuding through the platform in a valley of one of the corrugations 13. The battery leads are interconnected in series and/or parallel groups to provide the necessary voltages and currents to the switch poles. Power is supplied from board 24 to a reversible scan motor 27 through additional leads 28. Power for the circuits on the scanning board passes through one or more centering springs 29 which permit the scanning board to oscillate about its axis of rotation. Slip rings or other similar connects can also be used.

To synchronize the drive power to the scan motor 27 with the position of the scanning board, an indexing arm 33 is attached to the latter. As the scanning board approaches a preselected angular position the arm passes between at least one positioning LED 30 and a photo detector 31 located in a fixed position with respect to the optical platform. The indexing arm is thin at its outer extremity to permit close spacing of the LED and photodetector, but wide enough to cover the entire LED. Using the same size LED as found in the array with 15–20 diodes and a square image the switching interval is approximately 5 percent of total sweep. It is preferred to use a pair of these fixed detectors to sense both of the maximum deflection limits of the indexing arm. Other synchronizing schemes are possible using physically engaged contacts, impedance variation in the motor windings, strain gauges on spring elements, and angularly varied impedance devices such as potentometers. Spring bumpers may be used to provide quick turn around at the end of each scan and to provide a more constant sweep velocity. The circuitry used on the power control board will be discussed further in connection with FIG. 4.

The optical platform can be made from metal, plastic or other suitable material. The lenses also may be made from plastic to reduce the total weight. A rubber or plastic eyeshield 32 is attached to the optical platform around the eyepiece to prevent sidelighting interference with the dark adaption of the users eye. Switch 25 may be moved to the rear of the platform where it will be acutated by forehead or cheekbone of the user as the eyeshield is depressed. Eyeshields are also available with mechanical shutters which open when pressed to the users face. This prevents illumination from the LEDs to exposed parts of the users body during clandestine operations.

FIG. 3 shows one of a plurality of amplifier circuits carried by the scanning board. There is one such circuit for each detector and LED pair, fifteen to twenty pairs being considered a wise minimum. The input is AC coupled followed by two DC coupled 741 amplifiers A1 and A2 the first of which has a high frequency cutoff around 5 kilocycles to eliminate noise. The resulting signal is then AC coupled to a Darlington pair Q1 and Q2 which provides the controlled current needed to fire the LED. The detector diodes are manufactured on a single semiconductor chip which also incorporates a field effect transistor connected to each diode. It is the output of this transistor that is connected to input T1. The associated LED is connected to terminal T2. Circuit grounds are all common. The values of the various components are given in Table I.

Figure 4:
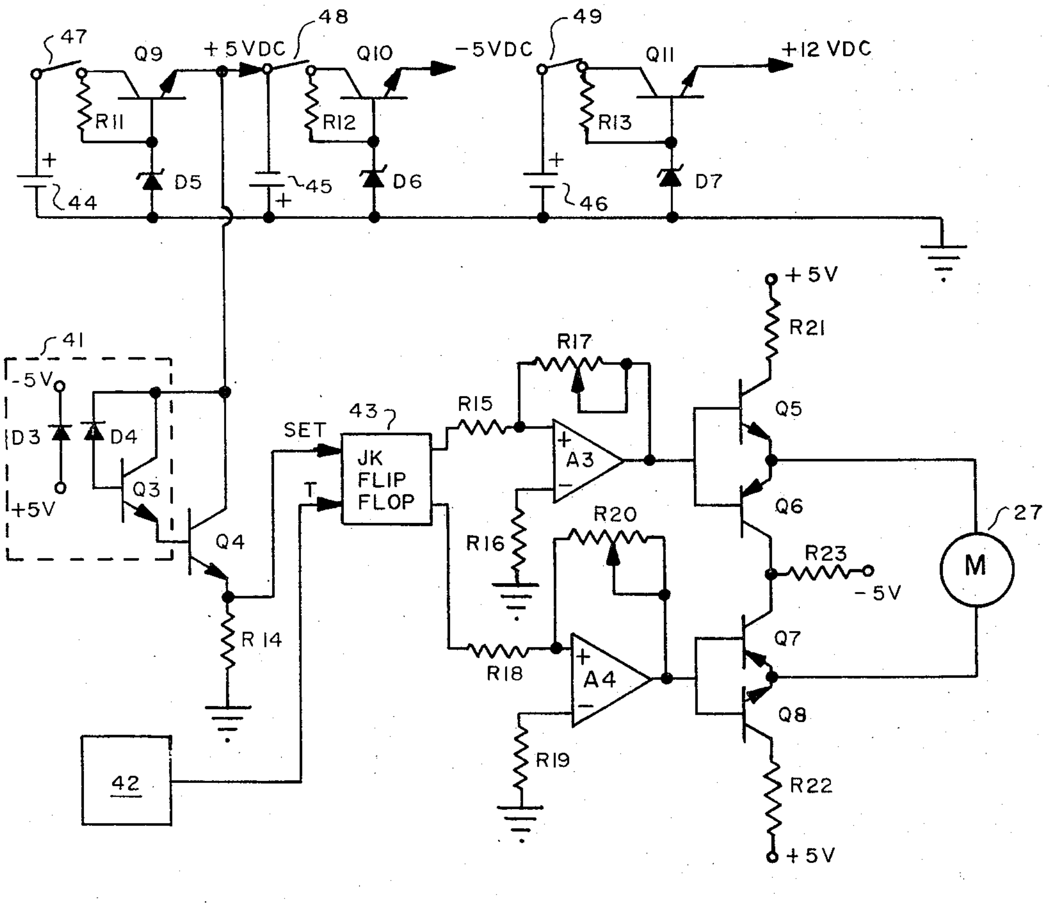
FIG. 4 shows a schematic diagram of a power refinement circuit mounted on the power control boards 24 (FIGS. 1 and 2).

FIG. 4 shows the circuitry carried by the power control boards. Batteries 44, 45 and 46 represent groups of A-cells. Contacts 47, 48 and 49 are part of switch 25. Voltage regulators are provided to furnish constant supply voltages for the motor control and signal circuits the latter having been previously described. Required voltages are shown at appropriate points except for A2–A4 which use the same −5v and +5v supplies as A1, binary 43 which uses +5v and the detector FETs which require +12v. The motor control circuit receives signals from photo detector 31 (FIGS. 1 and 2) preferably as part of a commercially available unit which also includes an LED and output photo transistor Q2. This is connected to a second transistor Q3 to interface with circuit 43. The output from this and a similar complementary photo detection circuit 42 are fed to the trigger and set inputs of binary flip-flop 43. The complementary outputs are connected to the inverting inputs of amplifiers A3 and A4. The resulting push-pull outputs from A3 and A4 control the chain of transistors Q5–Q8 to provide the instantaneous current polary needed by the scan motor 27. Either half of the push-pull circuits between binary 43 and motor 27 may be omitted if sufficient spring action is provided. Values of these circuit components are also included in Table I.

Numerous variations of the above described embodiments will be obvious to those skilled in art but the present invention is limited only as specified in the claims which follow.

TABLE I

RESISTORS (OHMS)

(¼ watt on less unless specified)

| | | | |
|---|---|---|---|
| $R_1$ | 1,000 | $R_{12}$ | 150 |
| $R_2$ | 33,000 | $R_{13}$ | 150 |
| $R_3$ | 1,000,000 | $R_{14}$ | 570 |
| $R_4$ | 1,000,000 | $R_{15}$ | 1,000 |
| $R_5$ | 10,000 | $R_{16}$ | 1,000 |
| $R_6$ | 10,000 | $R_{17}$ | 10,000 |
| $R_7$ | 1,000,000 | $R_{18}$ | 1,000 |
| $R_8$ | 27,000 | $R_{19}$ | 1,000 |
| $R_9$ | 22,000 | $R_{20}$ | 10,000 |
| $R_{10}$ | 330 | $R_{21}$ | 52 |
| $R_{11}$ | 150 | $R_{22}$ | 52 |
| | | $R_{23}$ | 52 |

CAPACITORS (MFD)

(12v or less)

| | | | |
|---|---|---|---|
| $C_1$ | 0.01 | $C_3$ | 220 pf |
| $C_2$ | 0.33 | $C_4$ | 0.033 |

DIODES

| | | |
|---|---|---|
| $D_1$ (Infrared Detector) | $D_5$ | 1W Zener 6ᵛ |
| $D_2$ (LED) | $D_6$ | 1W Zener 6ᵛ |
| $D_3$ Spectronics Phototransistor 1636-2 | $D_7$ | 1W Zener 12ᵛ |
| $D_4$ Spectronics Phototransistor 1636-2 | | |

JK — Flip-Flop SN 5476N or any suitable flip-flop used in the reset-set mode.

$A_1$–$A_4$ — Operational Amplifiers Mini Systems, Inc., Quad 741 Reversible Motor Aeroflex Brushless D.C. Torgue Motor Type – TQ 18W – 30 or TQ 10Y–1–Y

We claim:

1. An infrared viewer comprising;

an optical platform;

a an infrared light image projection system mounted on said platform having a given focal plane adjacent said platform;

a scanning board mounted for circular oscillation on said platform about a scan axis parallel to said focal plane but spaced therefrom with a scanning edge of said board lying substantially in said focal plane;

a linear array of infrared detectors mounted on said scanning edge parallel to said scan axis; and an electronic display means coupled to said board and synchronized to its angular position relative to said focal plane for displaying the information received by said detectors in real time as a function of said angular position.

2. An infrared viewer according to claim 1 wherein;

said projection system is a catadioptic reflecting system.

3. An infrared viewer according to claim 1 wherein;

a motor means is mounted between said scanning board and said platform to impart an angular velocity between said board and said platform.

4. An infrared viewer according to claim 1 wherein:

said display means includes an array of light emitting diodes equal in number to said infrared detectors and mounted on a viewing edge of said board spaced from and parallel to said scan axis.

5. An infrared viewer according to claim 4 wherein;

each detector is connected to a separate light emitting diode to form a conversion pair the diodes and detectors being arranged so that the straight lines joining the centers of each connected pair passes through a common point.

6. The viewer according to claim 5 wherein;

each detector is coupled to a light emitting diode through at least one amplifier.

7. The viewer according to claim 1 wherein;

a power supply is mounted on said optical platform and electrically coupled to said scanning board by means of a relative motion conductor.

8. The viewer according to claim 7 wherein;

said relative motion conductor is a slip ring arrangement.

9. The viewer according to claim 7 wherein;

said relative motion conductor is a flexible spring firmly attached to said platform and said scanning board.

10. The viewer according to claim 3 further including;

a control circuit means mounted on said platform to reverse said motor in response to a current pulse;

a pair of position detector means mounted on said platform and connected to said control circuit means to generate a current pulse when said scanning board occupies either of two limiting scan positions.

* * * * *